(12) United States Patent
Chuang et al.

(10) Patent No.: US 11,108,255 B2
(45) Date of Patent: Aug. 31, 2021

(54) CHARGING BASE

(71) Applicant: PEGATRON CORPORATION, Taipei (TW)

(72) Inventors: Wen-Chang Chuang, Taipei (TW); Shih-Wei Hung, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 406 days.

(21) Appl. No.: 16/373,792

(22) Filed: Apr. 3, 2019

(65) Prior Publication Data

US 2019/0372367 A1 Dec. 5, 2019

(30) Foreign Application Priority Data

Jun. 1, 2018 (TW) .................................. 107119082

(51) Int. Cl.
*H02J 7/00* (2006.01)
*G05D 1/02* (2020.01)

(52) U.S. Cl.
CPC .......... *H02J 7/0045* (2013.01); *G05D 1/0225* (2013.01); *G05D 2201/02* (2013.01)

(58) Field of Classification Search
USPC ................................ 320/106, 107, 109, 110
See application file for complete search history.

(56) References Cited

U.S. PATENT DOCUMENTS

| 2004/0022388 A1* | 2/2004 | Chan .................. H01R 13/2421 379/455 |
| 2015/0115876 A1 | 4/2015 | Noh et al. |
| 2017/0245714 A1* | 8/2017 | Son ....................... A47L 9/0081 |

FOREIGN PATENT DOCUMENTS

| CN | 102799181 A | 11/2012 |
| CN | 203466319 U | 3/2014 |
| CN | 203491490 U | 3/2014 |
| CN | 205195321 U | 4/2016 |
| CN | 104586320 B | 6/2017 |

* cited by examiner

*Primary Examiner* — Brian Ngo
(74) *Attorney, Agent, or Firm* — McClure, Qualey & Rodack, LLP

(57) ABSTRACT

A charging base includes a charging cradle, a pad plate, and a recess positioning portion. A mobile device includes a bottom base, a contact portion disposed on the bottom base, and a drive wheel drives the mobile device to move. The charging cradle includes a platform and a charging contact portion, and a height of the charging contact portion is greater than a height of the bottom base, when the drive wheel moves onto the pad plate, the height of the bottom base is greater than the height of the charging contact portion, when the drive wheel reaches the recess positioning portion while moving from the pad plate toward the charging cradle, the height of the bottom base is less than or equal to the height of the charging contact portion, so that the bottom base covers the platform and the contact portion is in contact with the charging contact portion.

11 Claims, 4 Drawing Sheets

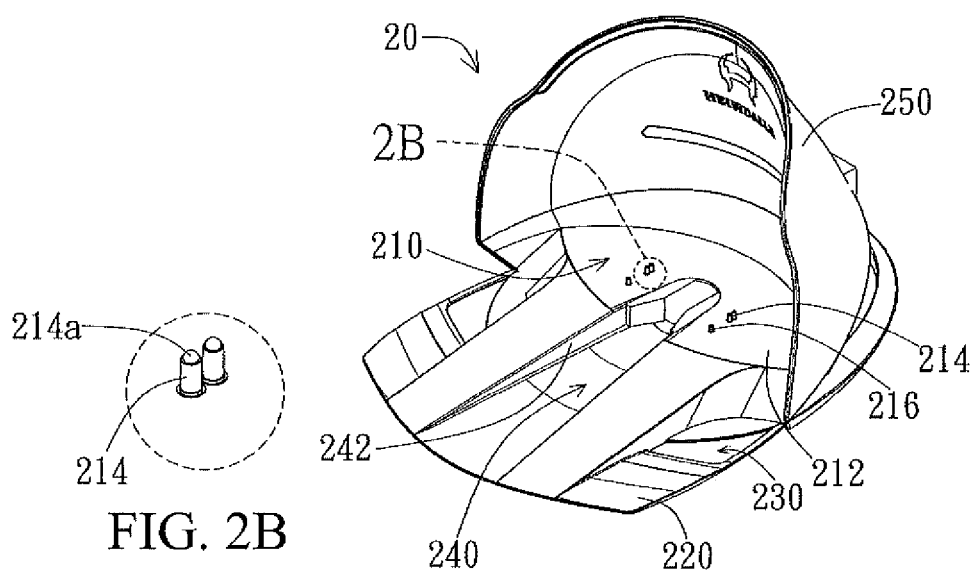
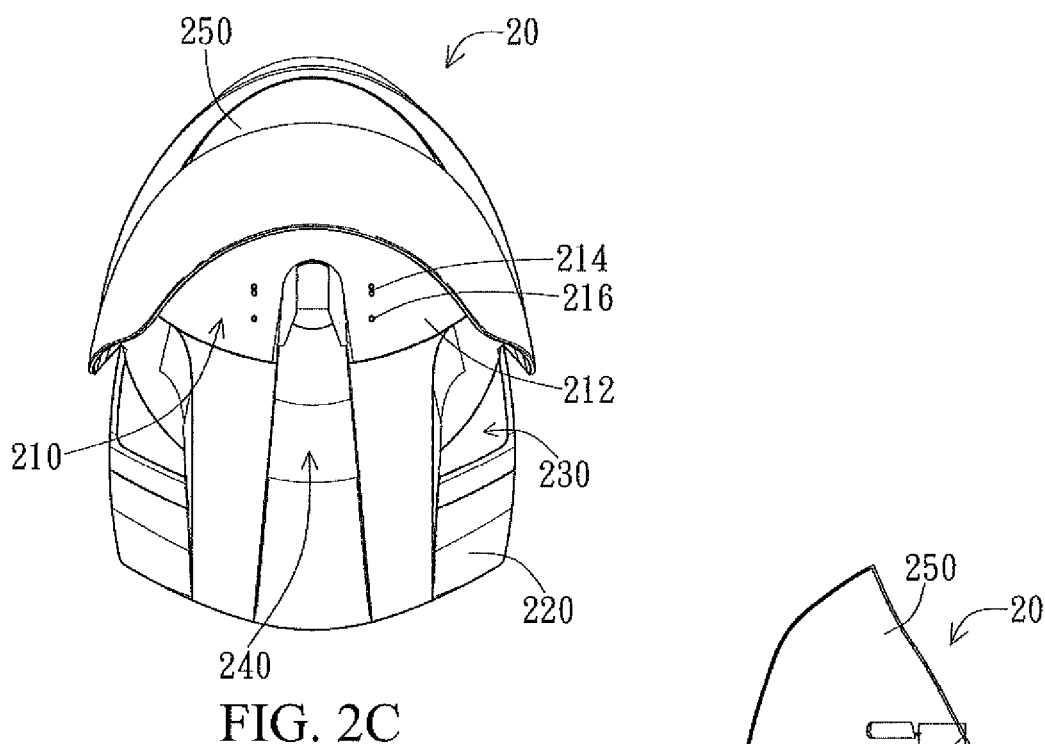

CHARGING BASE

CROSS-REFERENCE TO RELATED APPLICATION

This non-provisional application claims priority under 35 U.S.C. § 119(a) to Patent Application No. 107119082 filed in Taiwan, R.O.C. on Jun. 1, 2018, the entire contents of which are hereby incorporated by reference.

BACKGROUND

Technical Field

The application relates to a charging base, and specifically, to a charging base applied to a mobile device.

Related Art

When needing to be charged, a conventional mobile device generally moves to a charging base, so that a contact of the mobile device is in contact with a contact of the charging base. However, when the mobile device moves to the charging base, a bottom base of the mobile device usually knocks into the contact of the charging base. This easily causes the contact to become loose or be damaged, and as a result, the mobile device cannot be charged effectively.

In addition, a conventional charging base generally uses a spring as a contact, so that the mobile device presses the spring by using the appearance during a moving process, to enable a metal contact at the bottom of the mobile device to be in contact with the spring for charging. However, a spring-type contact generally has a power of, for example, approximately 45 W, and cannot withstand a higher power, and therefore is not suitable for a rapid charging application of the mobile device.

SUMMARY

An objective of the application is to provide a charging base, configured to charge a mobile device. The charging base has a lifting design, to reduce a probability that the mobile device knocks into a charging contact during a process of moving to a charging position, thereby reducing a probability of damaging the charging contact.

Another objective of the application is to provide a charging base, configured to charge a mobile device. The charging base has a guide design, to guide the mobile device to move to a charging position.

Still another objective of the application is to provide a charging base, configured to charge a mobile device. The charging base uses an elastomeric probe as a charging contact to improve a withstand capability for a high power, and is suitable for a high-power rapid charging application.

In an embodiment, the application provides a charging base, disposed on a bearing surface and configured to charge a mobile device, where the mobile device includes a bottom base, a contact portion disposed on the bottom base, and a drive wheel protruding from the bottom base and driving the mobile device to move. The charging base according to the application includes a charging cradle, a pad plate, and a recess positioning portion. The charging cradle includes a platform and a charging contact portion, the charging contact portion protrudes from the platform, and a first height existing between the charging contact portion and the bearing surface is greater than an bottom base height between the bottom base and the bearing surface. The pad plate is disposed on a movement path on which the mobile device moves toward the charging cradle, and a second height exists between the pad plate and the bearing surface, so that when the drive wheel moves onto the pad plate, a sum of the second height and the bottom base height is greater than the first height. The bottom base of the mobile device is located above the charging contact portion, and a first gap exists between the bottom base and the charging contact portion. The recess positioning portion is disposed between the charging cradle and the pad plate and located on the movement path on which the mobile device moves toward the charging cradle, a third height exists between the recess positioning portion and the bearing surface, when the drive wheel reaches the recess positioning portion while moving from the pad plate toward the charging cradle, a sum of the third height and the bottom base height is less than or equal to the first height, so that the bottom base covers the platform and the contact portion is in contact with the charging contact portion.

In an embodiment, the mobile device moves on the bearing surface by using the drive wheel; a first height exists between a vertex of the charging contact portion and the bearing surface, a second height exists between a top surface of the pad plate and the bearing surface, and a sum of the second height and the bottom base height is greater than the first height.

In an embodiment, the mobile device further includes an alignment piece; the charging base further includes a guide portion, the guide portion is disposed on one side of each of the pad plate and the recess positioning portion, and the guide portion is configured to enable the alignment piece to be aligned so as to guide the mobile device to move.

In an embodiment, the guide portion is a guide path, and a width of the guide path increases toward a direction relatively away from the charging cradle.

In an embodiment, the mobile device further includes at least one idle wheel, the at least one idle wheel protrudes from the bottom base, when the mobile device moves toward the charging cradle, the guide path is configured to allow the at least one idle wheel to move on the guide path.

In an embodiment, the charging base according to the application further includes an inclined surface, and the inclined surface is disposed on the movement path on which the mobile device moves toward the charging cradle and is configured to guide the drive wheel to move onto the pad plate.

In an embodiment, a first horizontal distance exists between an end portion of the bottom base and an axial center of the drive wheel, and a second horizontal distance exists between the inclined surface and the charging contact portion, the second horizontal distance is greater than the first horizontal distance.

In an embodiment, the recess positioning portion is a recess hole or an opening hole between the charging cradle and the pad plate.

In an embodiment, the charging cradle further includes a detection portion, the detection portion is adjacent to the charging contact portion and protrudes from the platform, when the drive wheel moves to the pad plate, a second gap exists between the detection portion and the bottom base, and the second gap is greater than the first gap; when the drive wheel moves to the recess positioning portion, the detection portion is in contact with the bottom base.

In an embodiment, the charging contact portion includes an elastomeric probe, and a top portion of the elastomeric probe is provided with a ball.

In an embodiment, the charging base further includes a baffle plate, the baffle plate is disposed at the other end of the charging cradle opposite to the pad plate, and the baffle plate is configured to stop the mobile device.

Compared with the conventional technology, the charging base applied to a mobile device in the application has a lifting design to reduce a probability that the mobile device knocks into a charging contact during a process of moving to a charging position, thereby reducing a probability of damaging the charging contact. In addition, the charging base applied to a mobile device in the application uses an elastomeric probe as a charging contact, to improve a withstand capability for a high power, and is suitable for a high-power charging application.

BRIEF DESCRIPTION OF THE DRAWINGS

FIG. 2A to FIG. 2D are a three-dimensional view of a charging base, an enlarged view of a charging contact portion, a top view of a charging base, and a sectional view of a charging base according to an embodiment of the application.

DETAILED DESCRIPTION OF THE EMBODIMENTS

Figure 1A:
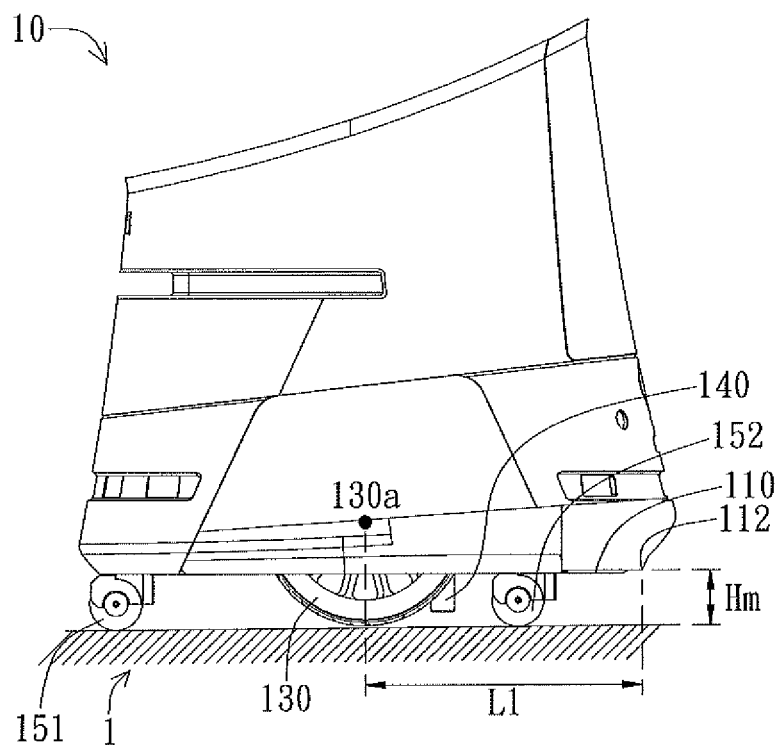
FIG. 1A and FIG. 1B are a side view and a bottom view of a mobile device that can use a charging base according to the application.
Figure 1B:
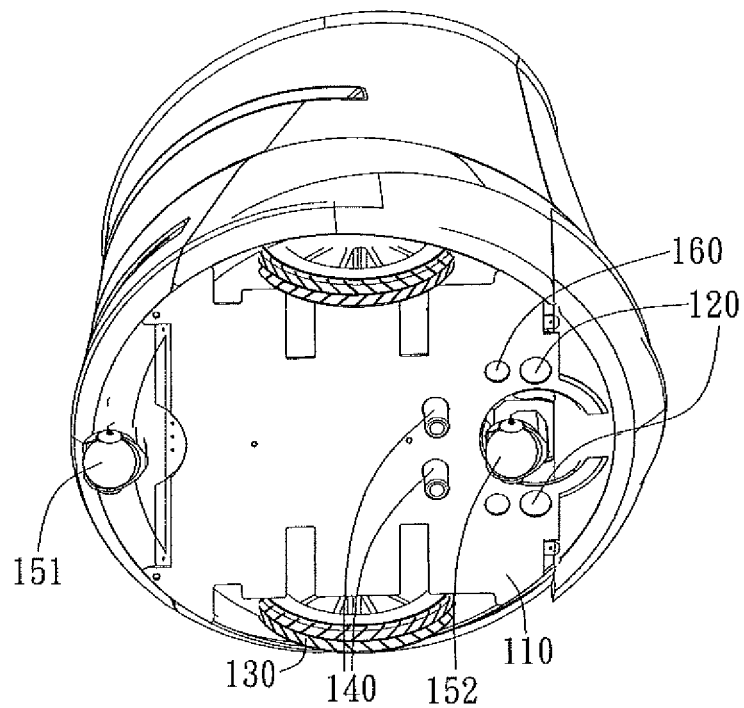

The application provides a charging base, particularly a charging base configured to charge a mobile device. Specifically, the charging base according to the application is preferably applied to any mobile device in which a contact is disposed on an bottom base, for example, a vacuum cleaning robot (vacuum cleaner) or a toy vehicle, to achieve a function automatically charging the mobile device, but the application is not limited thereto. For example, as shown in FIG. 1A and FIG. 1B, a mobile device 10 preferably includes an bottom base 110, a contact portion 120, and a drive wheel 130. The contact portion 120 is disposed on the bottom base 130 and is adjacent to an end portion 112 of the bottom base 110. The contact portion 120 is preferably, but not limited to, a metal contact area coplanar with a bottom surface of the bottom base 110. The drive wheel 130 protrudes from the bottom base 110 and drives the mobile device 10 to move. In addition, a distance by which the drive wheel 130 protrudes from the bottom base 110 may be considered as a height of the bottom base 110, that is, a height between the bottom base 110 and a bearing surface 1 that supports the drive wheel 130 to move (that is, an bottom base height Hm). In this embodiment, a pair of drive wheels 130 preferably protrudes from two sides of the bottom base 110, and a first horizontal distance L1 exists between the end portion 112 of the bottom base 110 and an axial center 130 of the drive wheel 130.

In addition, the mobile device 10 further selectively includes an alignment piece 140, configured to correct a movement route of the mobile device 10. The alignment piece 140 preferably protrudes from a central area of the bottom base 110, when the mobile device 10 moves on the bearing surface 1 by using the drive wheel 130, a preset spacing exists between the alignment piece 140 and the bearing surface 1. In other words, a distance by which the alignment piece 140 protrudes from the bottom base 110 is preferably less than the distance by which the drive wheel 130 protrudes from the bottom base 110. Therefore, when the mobile device 10 moves on the bearing surface 1 by using the drive wheel 130, the alignment piece 140 is not in contact with the bearing surface 1. The mobile device 10 may further include a first idle wheel 151 and a second idle wheel 152, and the first idle wheel 151 and the second idle wheel 152 are preferably disposed at a front end and a rear end of the central area of the bottom base 110 respectively. One of the first idle wheel 151 and the second idle wheel 152 preferably includes a cushioning design, to constitute a steady movement plane with the drive wheel 130. In this embodiment, the second idle wheel 152 adjacent to the contact portion 120 (or the end portion 112) preferably includes a cushioning design, but the application is not limited thereto. In addition, the mobile device 10 further selectively includes an indication portion 160, configured to instruct to perform charging. The indication portion 160 is disposed on the bottom base 130, and the indication portion 160 is preferably, but not limited to, a metal contact area coplanar with the bottom surface of the bottom base 110. The indication portion 160 is preferably adjacent to the contact portion 120, and is located on a side away from the end portion 112.

The following describes in detail the charging base 20 applied to the mobile device 1 according to the embodiments of the application with reference to the accompanying drawings.

The charging base 20 according to the application is preferably disposed on the bearing surface 1. The bearing surface 1 is, for example, but not limited to, a ground. The bearing surface 1 may be any suitable plane in which the mobile device 10 moves. As shown in FIG. 2A to FIG. 2D, in an embodiment, the charging base 20 includes a charging cradle 210, a pad plate 220, and a recess positioning portion 230. The charging cradle 210 includes a platform 212 and a charging contact portion 214. The charging contact portion 214 protrudes from the platform 212, and a first height H1 existing between the charging contact portion 214 and the bearing surface 1 is greater than the bottom base height Hm between the bottom base 110 and the bearing surface 1. For example, the first height H1 exists between a vertex of the charging contact portion 214 and the bearing surface 1, and the first height H1 is greater than the bottom base height Hm. The pad plate 220 is disposed opposite to the charging cradle 210, and the pad plate 220 is disposed on a movement path on which the mobile device 10 moves toward the charging cradle 210. A second height H2 exists between the pad plate 220 and the bearing surface 1. For example, the second height H2 exists between a top surface 224 of the pad plate 220 and the bearing surface 1, and a sum of the second height H2 and the bottom base height Hm is greater than the first height H1 (that is, H2+Hm>H1). The recess positioning portion 230 is disposed between the charging cradle 210 and the pad plate 220 and located on the movement path on which the mobile device 10 moves toward the charging cradle 210. A third height H3 exists between the recess positioning portion 230 and the bearing surface 1, and a sum of the third height H3 and the bottom base height Hm is less than or equal to the first height H1 (that is, H3+Hm≤H1). In other words, the top surface 224 of the pad plate 220 protrudes from the recess positioning portion 230, so that a step exists between the top surface 224 of the pad plate 220 and the recess positioning portion 230.

Specifically, the charging cradle 210 is preferably a main body for charging of the charging base 20 and includes a circuit required for charging. In addition, the platform 214 is preferably an upper surface of a housing of the charging cradle 210, and a lower surface of the housing of the charging cradle 210 is disposed on the bearing surface 1. In an embodiment, the charging contact portion 214 is preferably an elastomeric probe, and the charging contact portion 214 is more preferably, but not limited to, a top portion of an elastomeric probe with a ball 214a. In addition, the charging contact portion 214 may be provided with a plurality of elastomeric probes based on a charging power, and the elastomeric probe may preferably withstand a voltage/current of approximately 30 V/12 A (a power of approximately 360 W), but the application is not limited thereto.

Pad plates 220 are located on movement paths on which the drive wheels 130 move toward the charging cradle 210, for example, located in front of the charging contact portion 214 and on two opposite sides of the charging contact portion 214, to correspond to a pair of drive wheels 130. In an embodiment, the top surface 224 of the pad plate 220 is preferably, but not limited to, a plane. In other embodiments, the top surface 224 of the pad plate 220 may be an arc convex surface. In addition, the charging base 20 according to the application may further include an inclined surface 222, the inclined surface 222 is disposed on the movement path on which the mobile device 1 moves toward the charging cradle 210, and the inclined surface 222 is configured to guide the drive wheel 130 to move onto the pad plate 220. In an embodiment, the inclined surface 222 and the pad plate 220 are preferably integrated into a plate in a shape of a right trapezoid, that is, the top surface 224 of the pad plate 220 is preferably a plane, and the inclined surface 222 inclines and extends downward from the top surface 224 of the pad plate 220 toward a direction away from the charging cradle 210 relative to the recess positioning portion 230. A slope and a length of the inclined surface 222 change based on a drive force of the mobile device 10, so that the drive wheel 130 of the mobile device 10 can smoothly move along the inclined surface 222 to the top surface 224 of the pad plate 220. In another embodiment (not shown), the inclined surface 222 and the pad plate 220 may be integrated into a trapezoidal plate having two opposite inclined surfaces, that is, in addition to the inclined surface 222, the pad plate 220 may also have an inclined surface that is on one side adjacent to the charging cradle 210 and that inclines and extends downward toward a direction approaching the charging cradle 210. In addition, slopes or lengths of the two inclined surfaces may be the same or different according to an actual application. In addition, a second horizontal distance L2 exists between a lower part of the inclined surface 222 and the charging contact portion 214, and the second horizontal distance L2 is greater than the first horizontal distance L1.

Corresponding to the pad plate 220, the recess positioning portion 230 is also disposed on the movement path on which the drive wheel 130 moves toward the charging cradle 210, and is closer to the charging cradle 210 than the pad plate 220. In this embodiment, the recess positioning portion 230 is preferably an opening hole between the charging cradle 210 and the pad plate 220. Therefore, the third height H3 between the recess positioning portion 230 and the bearing surface 1 is 0, but the application is not limited thereto. In other embodiments, the recess positioning portion 230 may be a recess hole between the charging cradle 210 and the pad plate 220, so that the third height H3 between the recess positioning portion 230 and the bearing surface 1 is not 0, and the third height H3 is less than the second height H2 between the pad plate 220 and the bearing surface 1.

In addition, in an embodiment, the charging base 210 may further include a guide portion 240, configured to enable the alignment piece 140 to be aligned so as to guide the mobile device 10 to move. Specifically, the guide portion 240 is disposed on one side of each of the pad plate 220 and the recess positioning portion 230. For example, the guide portion 240 is preferably disposed along the pad plate 220 and the recess positioning portion 230, and an extending direction of the guide portion 240 is preferably parallel to a movement direction of the mobile device 10, to guide the mobile device 10 to move. In an embodiment, the guide portion 240 is a guide path, when the mobile device 10 moves toward the charging cradle 210, the guide path may be configured to allow the idle wheels (for example, 151 and 152) of the mobile device 10 to move on the guide path. In an embodiment, a width of the guide path preferably increases toward a direction relatively away from the charging cradle 210. In other words, the guide portion 240 has a relatively small width at an end adjacent to the charging cradle 210, and the guide portion 240 has a relatively large width at an end away from the charging cradle 210. For example, the guide portion 240 may be, but is not limited to, an inverted U-shaped channel with a wide opening and a narrow bottom, and on two sides of the channel, there may be side walls 242 inclining and extending upward toward the charging cradle 210. In other embodiments, the guide portion 240 may be a groove with side walls extending toward the charging cradle 210, and heights of the side walls is consistent with each other.

In addition, in an embodiment, the charging cradle 210 further includes a detection portion 216, and the detection portion 216 is adjacent to the charging contact portion 214 and protrudes from the platform 212. Specifically, the detection portion 216 is disposed corresponding to the indication portion 160 of the mobile device 10, and a height between the detection portion 216 and the bearing surface 1 is preferably less than the first height H1 between the charging contact portion 214 and the bearing surface 1. For example, a distance by which the detection portion 216 protrudes from the platform 212 is preferably less than a distance by which the charging contact portion 214 protrudes from the platform 212. In an embodiment, the detection portion 216 is preferably an elastomeric probe, and is more preferably a top portion of an elastomeric probe having a ball.

In addition, the charging base 20 may further include a baffle plate 250, configured to stop the mobile device 10. Specifically, the baffle plate 250 is disposed at the other end of the charging cradle 210 opposite to the pad plate 220, that is, located at the end of the movement path on which the mobile device 10 moves toward the charging cradle 210, and is configured to stop the mobile device 10 and position the mobile device 10.

Figure 3A:
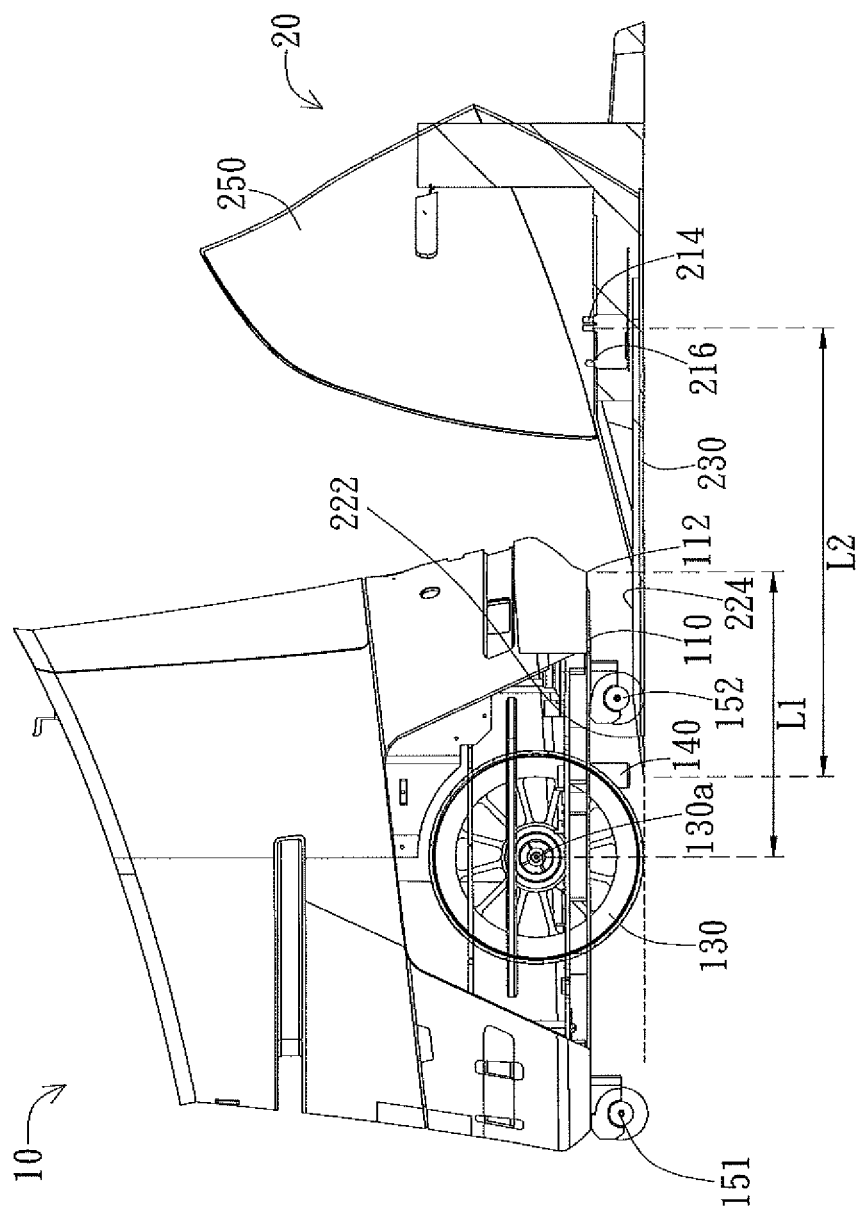
FIG. 3A to FIG. 3C are diagrams of an actuation relationship between a charging base and a mobile device according to the application.
Figure 3B:
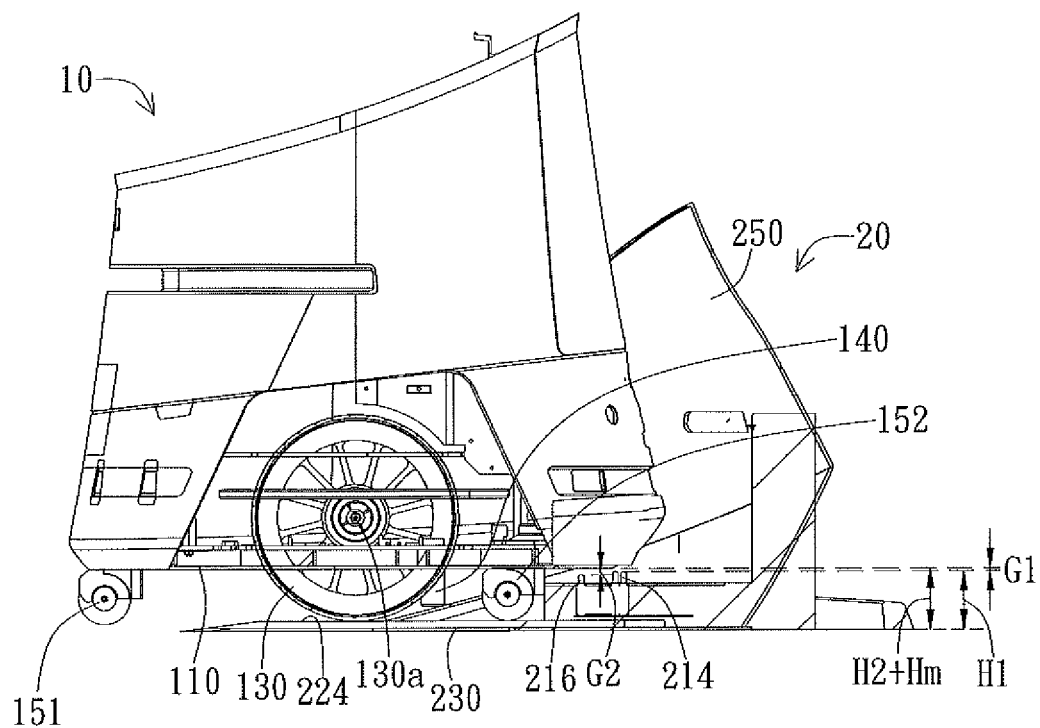
Figure 3C:
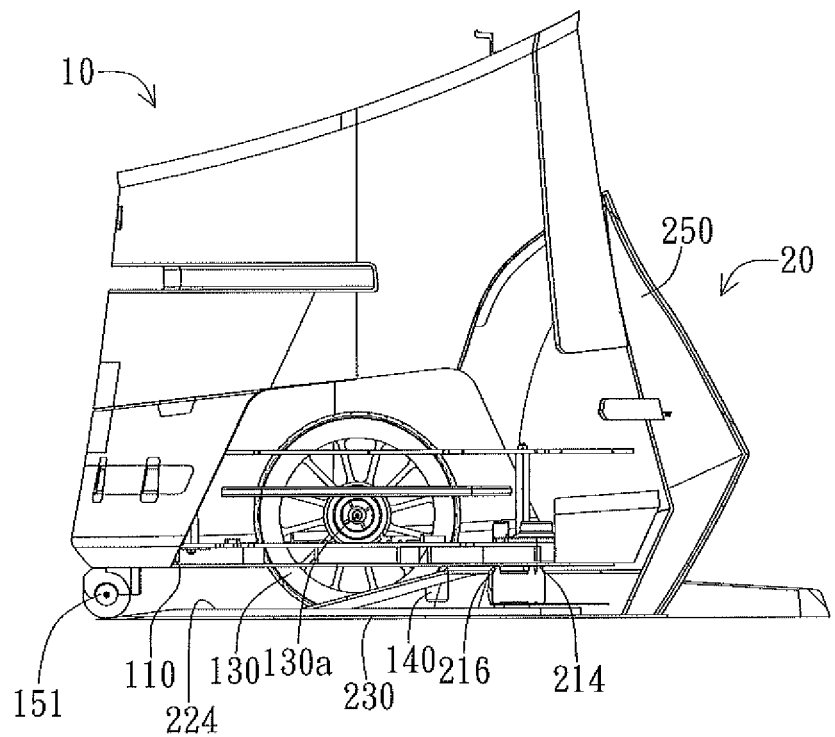

With reference to FIG. 3A to FIG. 3C, the following describes an actuation relationship when the mobile device 10 moves to the charging base 20. As shown in FIG. 3A, the second horizontal distance L2 between a lower end of the inclined surface 222 and the charging contact portion 214 is preferably greater than the first horizontal distance L1 between the end portion 112 of the bottom base 110 and the axial center 130a of the drive wheel 130. Therefore, when the mobile device 10 uses the end portion 112 as the front of a movement direction and approaches the lower end of the inclined surface 222 (that is, the drive wheel 130 is located in front of the lower end of the inclined surface 222) while moving toward the charging base 20 by using the drive wheel 130, the end portion 112 of the bottom base 110 does not touch the charging contact portion 214, thereby avoiding damage to the charging contact portion 214 caused by a collision with the charging contact portion 214. In other words, before the mobile device 10 is lifted by using the pad plate 220 (and the inclined surface 222), the end portion 112 of the bottom base 110 does not reach the charging contact portion 214, thereby preventing the bottom base 110 from frontally or laterally colliding with the charging contact portion 214. In addition, the second idle wheel 152 that is on the bottom base 110 and that is adjacent to the end portion 112 and the alignment piece 140 are preferably located at an opening end of the guide portion 240 (that is, located at an entry end of the guide path).

As shown in FIG. 3B, when the drive wheel 130 moves onto the pad plate 220, because the sum of the second height H2 and the bottom base height Hm is greater than the first height H1, a height of the bottom base 110 is greater than a height of the charging contact portion 214, so that the bottom base 110 of the mobile device 10 is located above the charging contact portion 214, and a first gap G1 exists between the bottom base 110 and the charging contact portion 214. Specifically, when the drive wheel 130 of the mobile device 10 continues to move and climbs along the inclined surface 222 to the top surface 224 of the pad plate 220, the sum of the second height H2 between the top surface 224 of the pad plate 220 and the bearing surface 1 and the bottom base height Hm is greater than the first height H1 between the vertex of the charging contact portion 214 and the bearing surface 1, so that when the drive wheel 130 moves to the pad plate 220, the bottom base 110 is lifted by the pad plate 220 and hence higher than the charging contact portion 214. Herein, it should be noted that before the drive wheel 130 leaves the pad plate 220, the end portion 112 of the bottom base 110 of the mobile device 10 preferably already reaches or exceeds a position directly above the charging contact portion 214, and a gap preferably exists between the contact portion 120 and the charging contact portion 214 and the two are not in contact with each other. That is, the bottom base 110 of the mobile device 10 is lifted by the pad plate 220 and hence higher than the charging contact portion 214, and therefore when moving on the top surface 224 of the pad plate 220, the bottom base 110 may be prevented from colliding with the charging contact portion 214. In addition, because the height between the detection portion 216 and the bearing surface 1 is less than the height between the charging contact portion 214 and the bearing surface 1, when the drive wheel 130 moves to the top surface 224 of the pad plate 220, a second gap G2 exists between the detection portion 216 and the bottom base 110, and the second gap G2 is greater than the first gap G1. In this embodiment, the first gap G1 is a difference between the sum of the second height H2 and the bottom base height Hm and the first height H1.

As shown in FIG. 3C, when the drive wheel 130 reaches the recess positioning portion 230 while moving from the pad plate 220 toward the charging cradle 210, because the sum of the third height H3 and the bottom base height Hm is less than or equal to the first height H1, a height of the bottom base 110 is less than or equal to a height of the charging contact portion 214, so that the contact portion 140 is in contact with the charging contact portion 214. Specifically, when the drive wheel 130 continues to move from the pad plate 220 toward the charging cradle 210 and reaches the recess positioning portion 230, the end portion 112 of the bottom base 110 exceeds the charging contact portion 214, and the contact portion 140 is preferably located directly above the charging contact portion 214. In addition, the sum of the third height H3 between the recess positioning portion 230 and the bearing surface 1 and the bottom base height Hm is less than or equal to the first height H1 between the vertex of the charging contact portion 214 and the bearing surface 1, so that when the drive wheel 130 moves to the recess positioning portion 230, the contact portion 140 is in contact with the charging contact portion 214. In other words, the bottom base 110 of the mobile device 10 descends due to the step between the recess positioning portion 230 and the pad plate 220, so that the contact portion 140 abuts against the charging contact portion 214 to be in contact with the charging contact portion 214, that is, no gap exists between the contact portion 140 of the bottom base 110 and the charging contact portion 214. In addition, because the bottom base 110 descends and the contact portion 140 abuts against the charging contact portion 214, when the drive wheel 130 moves to the recess positioning portion 230, the detection portion 216 is also in contact with the indication portion 160 of the bottom base 110, so that a triggering signal is generated to indicate that the contact portion 140 is appropriately in contact with the charging contact portion 214 and instruct the charging base 210 to charge the mobile device 10.

Herein, it should be noted that after the drive wheel 130 reaches the recess positioning portion 230 while moving from the pad plate 220 toward the charging cradle 210, the bottom base 110 may be in contact with the charging contact portion 214 and move relative to the charging contact portion 214, so that the contact portion 140 moves to the charging contact portion 214 and is further in contact with the charging contact portion 214. In this case, by using the ball 214a disposed on the charging contact portion 214, the bottom base 110 can move more smoothly relative to the charging contact portion 214, to reduce a probability of damaging the charging contact portion 214 due to the relative movement.

In addition, when the mobile device 10 moves to a position in FIG. 3C from the position in FIG. 3A (that is, moves to the recess positioning portion 230 from the front of the pad plate 220), the alignment piece 140, the second idle wheel 152, and the first idle wheel 151 of the mobile device 10 enter the guide portion 240 from the entry end of the guide portion 240, to move in the guide portion 240. The side walls 242 of the guide path of the guide portion 240 limit side shifting of the alignment piece 140, and the alignment piece 140 corrects the movement path by using a decreasing width of the guide portion 240, so as to effectively guide the mobile device 10 to move toward the charging cradle 210.

In addition, after the drive wheel 130 moves to the recess positioning portion 230, the mobile device 10 may adjust a position thereof in the recess positioning portion 230 by using the baffle plate 250. Specifically, after the drive wheel 130 moves to the recess positioning portion 230, the drive wheel 130 may continue to move in the recess positioning portion 230 till the mobile device 10 meets the baffle plate 250 and is stopped by the baffle plate 250. The mobile device 10 may adjust the position thereof in the recess positioning portion 230 accordingly, for example, move toward the pad plate 220 by a preset distance (that is, a horizontal distance between the contact portion 120 and a part, which collides with the baffle plate 250, of the mobile device 10), so that the mobile device 10 is positioned and the contact portion 140 is in contact with the charging contact portion 214.

The application has been described by using the foregoing embodiments. However, the foregoing embodiments are merely for illustrative purposes and are not intended for limitations. Those skilled in the art should know that other modifications on exemplary embodiments beyond the embodiments particularly described herein may be made without departing from the spirit of the application. Accordingly, such modifications fall within the scope of the application as limited solely by the appended claims.

What is claimed is:

1. A charging base, disposed on a bearing surface and configured to charge a mobile device, wherein the mobile device comprises a bottom base, a contact portion disposed on the bottom base, and a drive wheel protruding from the bottom base and driving the mobile device to move, and the charging base comprises:
   a charging cradle, comprising a platform and a charging contact portion, wherein the charging contact portion protrudes from the platform, and a first height existing between the charging contact portion and the bearing surface is greater than a bottom base height between the bottom base and the bearing surface;
   a pad plate, disposed on a movement path on which the mobile device moves toward the charging cradle, wherein a second height exists between the pad plate and the bearing surface, so that when the drive wheel moves onto the pad plate, a sum of the second height and the bottom base height is greater than the first height; the bottom base of the mobile device is located above the charging contact portion, and a first gap exists between the bottom base and the charging contact portion; and
   a recess positioning portion, disposed between the charging cradle and the pad plate and located on the movement path on which the mobile device moves toward the charging cradle, wherein a third height exists between the recess positioning portion and the bearing surface, when the drive wheel reaches the recess positioning portion while moving from the pad plate toward the charging cradle, a sum of the third height and the bottom base height is less than or equal to the first height, so that the bottom base covers the platform and the contact portion is in contact with the charging contact portion.

2. The charging base according to claim 1, wherein the mobile device moves on the bearing surface by using the drive wheel; the first height exists between a vertex of the charging contact portion and the bearing surface, the second height exists between a top surface of the pad plate and the bearing surface, and a sum of the second height and the bottom base height is greater than the first height.

3. The charging base according to claim 1, wherein the mobile device further comprises an alignment piece; the charging base further comprises a guide portion, the guide portion is disposed on one side of each of the pad plate and the recess positioning portion, and the guide portion is configured to enable the alignment piece to be aligned so as to guide the mobile device to move.

4. The charging base according to claim 3, wherein the guide portion is a guide path, and a width of the guide path increases toward a direction relatively away from the charging cradle.

5. The charging base according to claim 4, wherein the mobile device further comprises at least one idle wheel, and the at least one idle wheel protrudes from the bottom base.

6. The charging base according to claim 1, further comprising an inclined surface, wherein the inclined surface is disposed on the movement path on which the mobile device moves toward the charging cradle and is configured to guide the drive wheel to move onto the pad plate.

7. The charging base according to claim 6, wherein a first horizontal distance exists between an end portion of the bottom base and an axial center of the drive wheel, and a second horizontal distance exists between the inclined surface and the charging contact portion, the second horizontal distance is greater than the first horizontal distance.

8. The charging base according to claim 1, wherein the recess positioning portion is a recess hole or an opening hole between the charging cradle and the pad plate.

9. The charging base according to claim 1, wherein the charging cradle further comprises a detection portion, the detection portion is adjacent to the charging contact portion and protrudes from the platform, when the drive wheel moves to the pad plate, a second gap exists between the detection portion and the bottom base, and the second gap is greater than the first gap; when the drive wheel moves to the recess positioning portion, the detection portion is in contact with the bottom base.

10. The charging base according to claim 1, wherein the charging contact portion comprises an elastomeric probe and a top portion of the elastomeric probe is provided with a ball.

11. The charging base according to claim 1, wherein the charging base further comprises a baffle plate, the baffle plate is disposed at the other end of the charging cradle opposite to the pad plate, and the baffle plate is configured to stop the mobile device.

* * * * *